G. R. CADY & G. GREGORY.
Props for Hanging Lamps to Carriages.
No. 150,284.
Patented April 28, 1874.
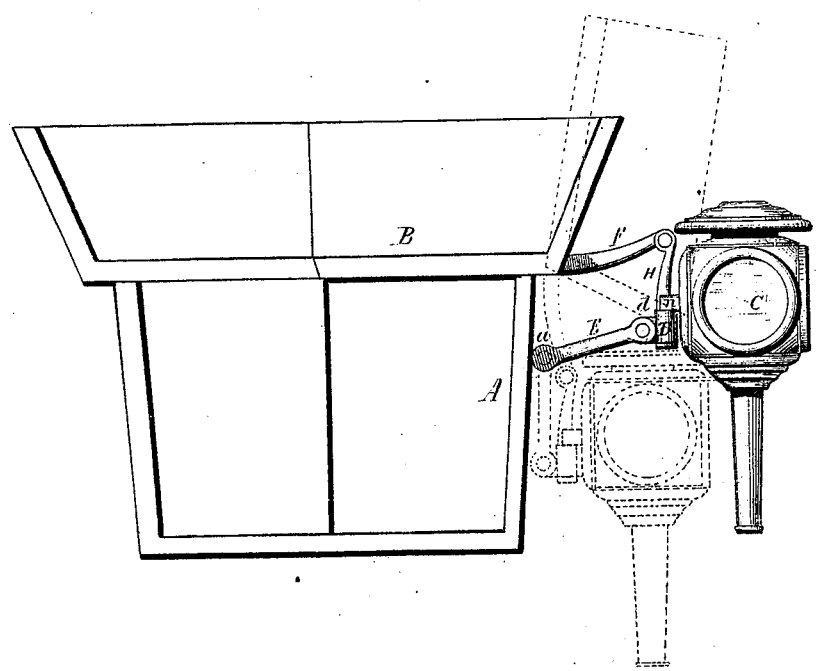
Witnesses
J. H. Shumway
A. J. Tibbits
Geo. R. Cady & Geo. Gregory
Inventors.
By Atty.
John R. Earle

UNITED STATES PATENT OFFICE

GEORGE R. CADY AND GEORGE GREGORY, OF NEW HAVEN, CONNECTICUT, ASSIGNORS TO WILLIAM H. BRADLEY & CO., OF SAME PLACE.

IMPROVEMENT IN PROPS FOR HANGING LAMPS TO CARRIAGES.

Specification forming part of Letters Patent No. 150,284, dated April 28, 1874; application filed April 10, 1874.

*To all whom it may concern:*

Be it known that we, GEORGE R. CADY and GEORGE GREGORY, of New Haven, in the county of New Haven and State of Connecticut, have invented a new Improvement in Hanging Lamps to Carriages; and we do hereby declare the following, when taken in connection with the accompanying drawing and the letters of reference marked thereon, to be a full, clear, and exact description of the same, and which said drawing constitutes part of this specification, and represents a front view.

This invention relates to an improvement in the mode of hanging carriage-lamps to that class of carriages known as English dog-carts—that is, a carriage in which the seat is divided in the center, so as to be turned over outward, to make a passage to the rear part of the carriage, or for other purpose.

In this class of carriages as heretofore constructed it has been required that the lamps be hung at some other point than beside the seat, or so far below the seat as to clear the seat when turned over, or to the seats so as to turn with it, to all of which there are serious objections too apparent to require mention here.

The object of this invention is to so arrange the lamp hangings or prop that the proper position of the lamp may be preserved and the lamp not tipped or turned out of vertical position when opening the seat; and it consists in connecting the lamp to the seat and body by parallel joints, that the lamp may drop as the seat opens and still preserve its perpendicularity.

A is the side of the body to which the part B of the seat is hinged so as to be turned up and outward, as denoted in broken lines, and in substantially the usual manner. C is the lamp, of the usual construction; D, the lamp-prop or socket, to which the lamp is secured in the usual manner. From the prop D to the body an arm, E, extends, jointed to the body and socket or prop D, as at *a d*. Attached to the seat is an arm, F, which extends out over the socket, and to the end of this arm a rod, H, is jointed, as at *f*, and which extends down and is jointed at its lower end to the socket D, as at *n*. This completes the construction. The arm F being rigid upon the seat, when the seat is turned up the arm throws down the socket, and with it the lamp. The connections E and H, with the arm F, preserve the perpendicularity of the socket D, and consequently of the lamp, the socket and lamp dropping as the seat is turned up until the seat is fully opened, as denoted in broken lines. Closing the seat brings the lamp back again to its position.

By this construction the lamp is adjusted in the most desirable position, and is in no way inconvenienced by the opening of the seat.

We claim as our invention—

In combination with the body and folding seat of a carriage the lamp-prop connected to both seat and body by jointed arms or rods, substantially as and for the purpose specified.

GEO. R. CADY.
GEO. GREGORY.

Witnesses:
A. J. TIBBITS,
J. H. SHUMWAY.